United States Patent
Zhou et al.

(10) Patent No.: US 11,123,925 B2
(45) Date of Patent: Sep. 21, 2021

(54) METHODS FOR MAKING 3D PRINTED PARTS USING A DYNAMIC BUILD PLATFORM AND 3D PRINTED PARTS FORMED THEREFROM

(71) Applicant: Ford Motor Company, Dearborn, MI (US)

(72) Inventors: Roy Zhou, Santa Clara, CA (US); Jevon Xiao, Palo Alto, CA (US); Andres Almeida Senatore, Mountain View, CA (US); Siddharthan Selvasekar, Livermore, CA (US); Daniel Boccuccia, San Francisco, CA (US); Daniel Russman, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 309 days.

(21) Appl. No.: 16/123,368

(22) Filed: Sep. 6, 2018

(65) Prior Publication Data
US 2020/0079018 A1 Mar. 12, 2020

(51) Int. Cl.
*B29C 64/245* (2017.01)
*B29C 64/25* (2017.01)
*B33Y 30/00* (2015.01)
*B33Y 10/00* (2015.01)

(52) U.S. Cl.
CPC ............ *B29C 64/245* (2017.08); *B29C 64/25* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 2015/0147424 A1 | 5/2015 | Bibas | |
| 2015/0151489 A1 | 6/2015 | Elsey | |
| 2015/0192919 A1* | 7/2015 | Sketch | G05B 19/182 700/118 |

(Continued)

FOREIGN PATENT DOCUMENTS

| | | |
|---|---|---|
| CN | 204622614 | 9/2015 |
| NL | 2014771 | 5/2015 |
| WO | 2017180958 | 10/2017 |

*Primary Examiner* — Matthew J Daniels
*Assistant Examiner* — Gregory Chad Grosso
(74) *Attorney, Agent, or Firm* — Burris Law, PLLC

(57) ABSTRACT

A method of 3D printing a part with an overhanging portion requiring support during printing is provided. The method includes moving a dynamically adjustable support member to support the overhanging portion during printing of the part. The dynamically adjustable support member may be moved from a retracted position to a support position after a first portion of the part is printed and the overhanging portion may be supported by the dynamically adjustable support member in the support position. The part may be printed in a 3D printing chamber with a base and at least one wall. The base may have a first dynamically adjustable support member and the at least one wall may have a second dynamically adjustable support member. A first overhanging portion and a second overhanging portion of the part may be printed over the first dynamically adjustable support member the second dynamically adjustable support member, respectively.

19 Claims, 6 Drawing Sheets

(56) References Cited

U.S. PATENT DOCUMENTS

| | | | |
|---|---|---|---|
| 2017/0217088 A1* | 8/2017 | Boyd, IV | B29C 64/106 |
| 2018/0162060 A1* | 6/2018 | Mark | B29C 64/245 |
| 2019/0054531 A1* | 2/2019 | Corsmeier | B33Y 30/00 |
| 2020/0329814 A1* | 10/2020 | Wang | B29C 64/245 |

* cited by examiner

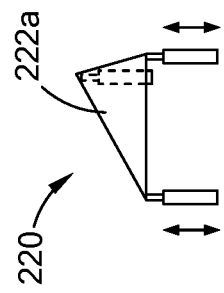
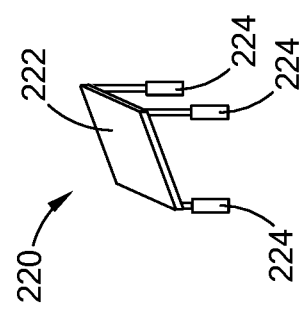
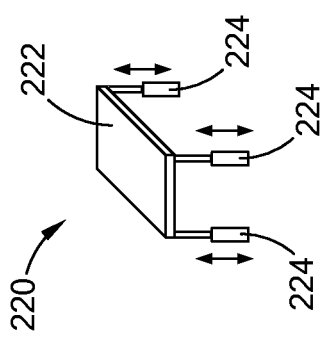
FIG. 5C
FIG. 5B
FIG. 5A
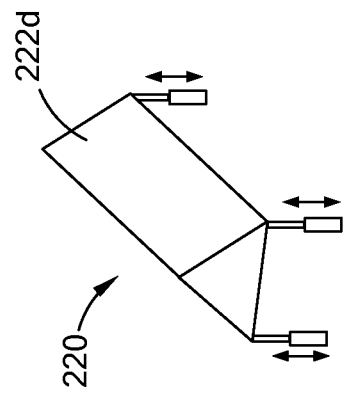
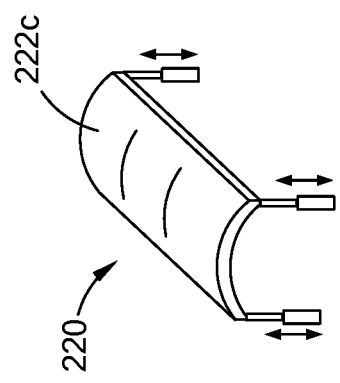
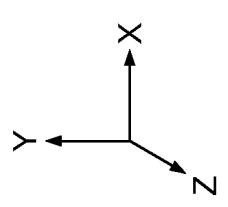
FIG. 5F
FIG. 5E
FIG. 5D
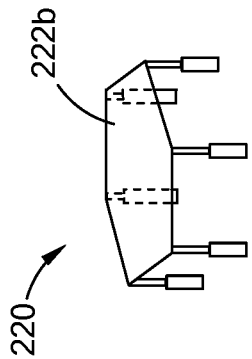

METHODS FOR MAKING 3D PRINTED PARTS USING A DYNAMIC BUILD PLATFORM AND 3D PRINTED PARTS FORMED THEREFROM

FIELD

The present disclosure relates to the field of 3D printing, and more specifically, to 3D printing using a dynamic build platform with one or more individually adjustable support members.

BACKGROUND

The statements in this section merely provide background information related to the present disclosure and may not constitute prior art.

Platforms used with three dimensional (3D) printers (also known as 'Build platforms") are generally a flat stationary surface, i.e., the surface does not move during the 3D printing process (also referred to herein simply as "printing"). The first surface of a 3D printed part (also referred to herein simply as a "part") to be printed is defined as the base surface and is typically printed on and is in contact with the build platform. Unsupported portions of a part spaced apart from the base surface, e.g., an overhanging ledge, shelf, flange, etc., may require support during the printing process in order to prevent sagging of the unsupported part before curing can occur. Accordingly, support material may be printed underneath the unsupported portion before it is printed to ensure structural strength of the part. Once 3D printing of the part is completed, the support material must be removed and discarded. Accordingly, the support material is waste in terms of extra material needed for support, time required to print the support material, and time to remove the support material.

The present disclosure addresses the issues of reducing the amount of support material needed during 3D printing.

SUMMARY

In one form of the present disclosure, a method of 3D printing a part using a dynamically adjustable support member is provided. The part has at least one portion that requires support during the 3D printing process and at least dynamically adjustable support member is moved to support the at least one portion during 3D printing of the part. The at least one dynamically adjustable support member may be moved from a retracted position to a support position after a first portion of the part is printed and the at least one portion requiring support may be supported by the at least one dynamically adjustable support member in the support position. The method may include 3D printing the part in a 3D printing chamber. In some aspects of the present disclosure, the 3D printing chamber may include a base and at least one wall, and the at least one dynamically adjustable support member may include a first dynamically adjustable support member extendable from the base and a second dynamically adjustable support member extendable from the at least one wall. Also, the at least one portion of the part requiring support may include a first overhanging portion and a second overhanging portion. The first overhanging portion may be printed over and supported by the first dynamically adjustable support member and the second overhanging portion may be printed over and supported by the second dynamically adjustable support member during 3D printing of the part.

In one aspect of the present disclosure, the first dynamically adjustable support member may be moved from a retracted position to a support position after a first portion of the part is printed and the first overhanging portion may be supported by the first dynamically adjustable support in the support position. In another aspect of the present disclosure, the second dynamically adjustable support member may be moved from a retracted position to a support position after a second portion of the part is printed and the second overhanging portion may be supported by the second dynamically adjustable support in the support position.

The method may include 3D printing a first portion of the part, moving the first dynamically adjustable support member from a retracted position to a support position after the first portion is printed, and 3D printing the first overhanging portion of the part such that the first overhanging portion is supported by the first dynamically adjustable support member in the support position. A second portion of the part may be printed, the second dynamically adjustable support member may be moved from a retracted position to a support position, and the second overhanging portion of the part may be printed such that the second overhanging portion is supported by the second dynamically adjustable support member in the support position. In some aspects of the present disclosure, the first overhanging portion extends from the first portion and the second overhanging portion extends from the second portion.

In another form of the present disclosure, a method of printing a 3D part includes 3D printing a first portion of a part in a 3D printing chamber, wherein the 3D printing chamber comprises a first dynamically adjustable support member. The first dynamically adjustable support member is moved from a retracted position to a support position after the first portion of the part has been printed and a first overhanging portion of the part is printed after the first dynamically adjustable support member has moved from the retracted position to the support position. Also, the first overhanging portion of the part is supported by the first dynamically adjustable support member in the support position. The 3D printing chamber may include a base and at least one wall angled relative to the base, and the base and the at least one wall may each include at least one dynamically adjustable support member such that the first dynamically adjustable support member in the support position extends from the base and a second dynamically adjustable support member in a support position extends from the at least one wall. The first overhanging portion of the part may be printed over the first dynamically adjustable support member before the second dynamically adjustable support member is moved from a retracted position to a support position. Also, a second overhanging portion of the part may be printed over the second dynamically adjustable support member after the second dynamically adjustable support is moved to the support position. In some aspects of the present disclosure, the first overhanging portion extends from the first portion and the second overhanging portion extends from the second portion.

In still another form of the present disclosure, a method of 3D printing a part includes printing a first portion of a part in a 3D printing chamber with at least one wall, and the at least one wall includes a dynamically adjustable support member operable to move from a retracted position to a support position. The dynamically adjustable support member is moved from the retracted position to the support position after the first portion of the part has been printed and a second portion is printed and supported by the dynamically adjustable support member in the support position while it is being printed. The second portion may be spaced apart from the first portion and the dynamically adjustable support member in the support position may be positioned between the first portion and the second portion of the part. In some aspects of the present disclosure, a support material is printed on the dynamically adjustable support member before 3D printing the second portion on the part. In such aspects, the second portion of the part may be printed on the support material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
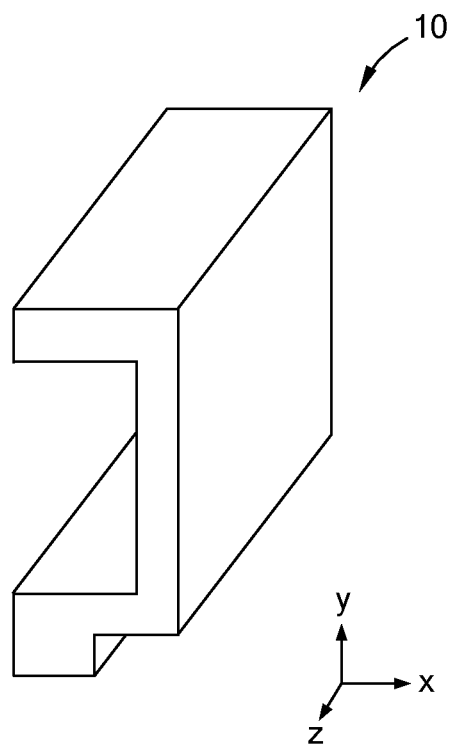
Figure 6:
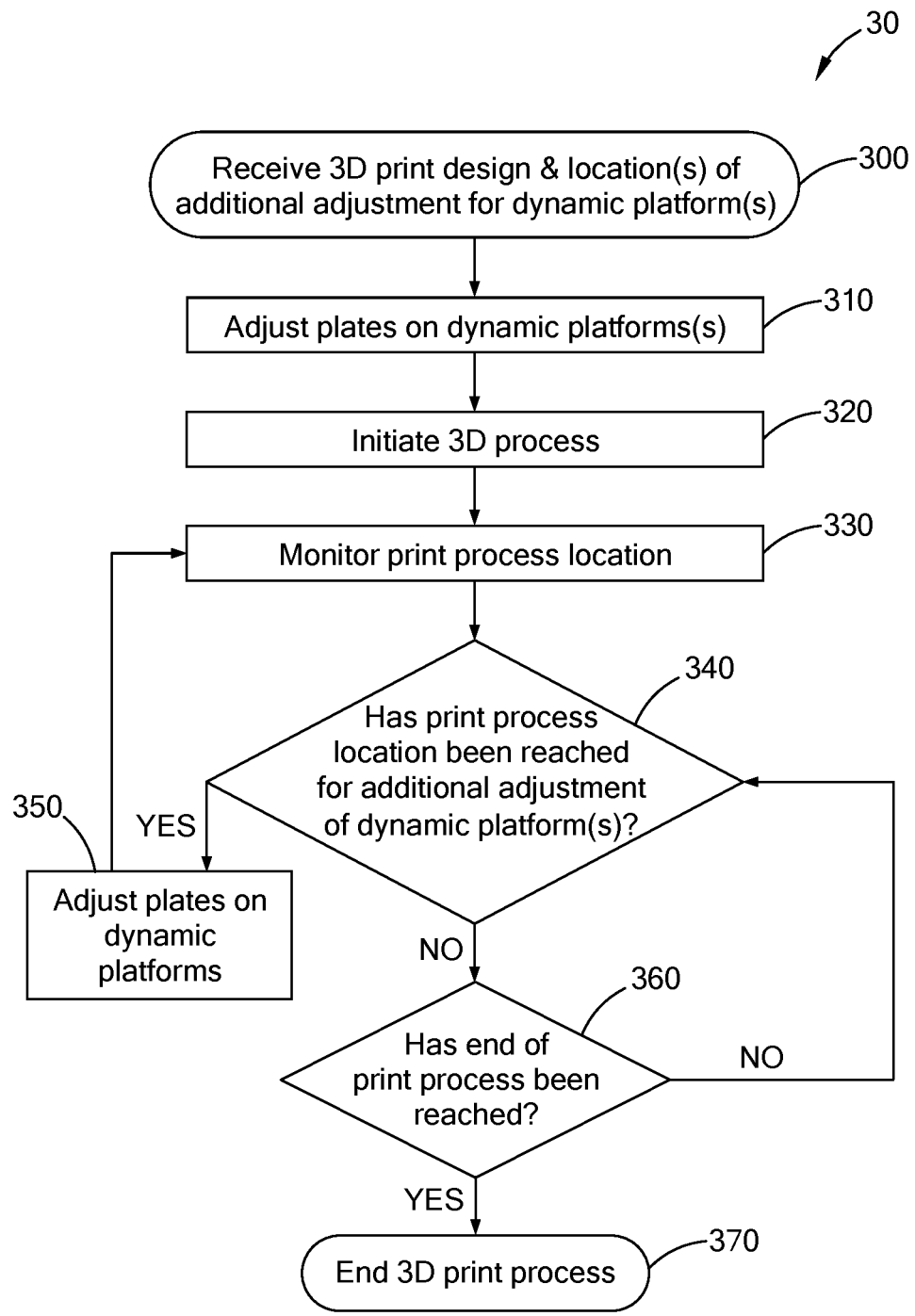

FIGS. 3A-3E schematically illustrate steps for forming a part according to the teachings of the present disclosure;

FIG. 4 is a perspective view of a part formed in accordance with the teachings of the present disclosure;

FIGS. 5A-5F are isolated perspective views of dynamically adjustable support members according to the teachings of the present disclosure; and FIG. 6 is a schematic illustration of a flow chart for a process for forming a part according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
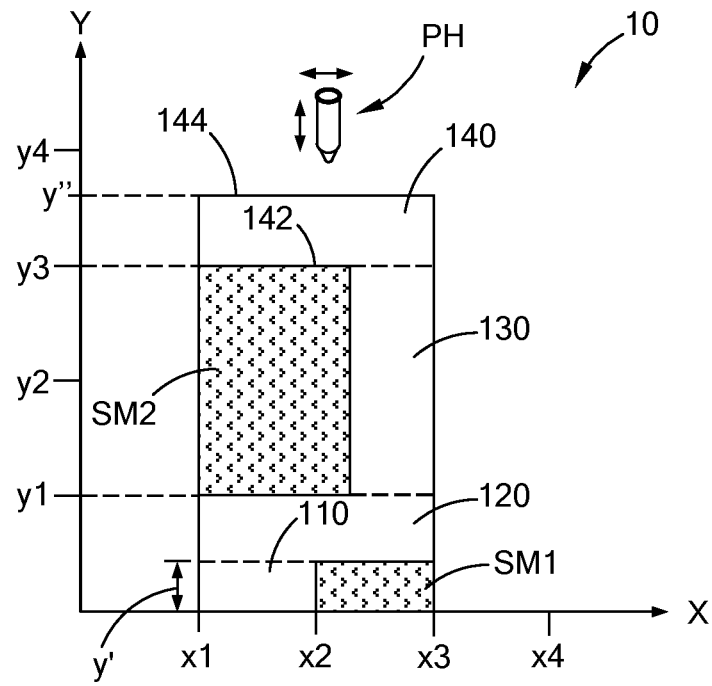
FIG. 1 is a schematic illustration of a process for forming a part using support material according to the prior art.

Referring to FIG. 1, a part 10 formed using a prior art method is schematically depicted. The prior art method generally includes 3D printing a first portion 100 of the part 10 using a printer head 'PH' between x1 and x2 along the X-axis and in the Y-direction. The printer head PH also prints a first support material SM1 between x2 and x3 while printing the first portion 100. After printing the first portion 100 and the first support material SM1 to a height of y', a second portion 110 is printed over (Y-direction) the first portion 100 between x1 and x2 along the X-direction, and the first support material SM1 is printed between x1 and x3 along the X-axis. Accordingly, a lower surface 122 of the second portion 120 is printed on the first support material SM1. Also, the first support material SM1 provides support for printing of the second portion 120 and thereby allows the second portion 120 to cure without sagging in the Y-direction. That is, without support provided by the first support material SM1, the second portion 120 may sag and/or exceed dimensional tolerances for the part 10. After the second portion 120 is printed to height of y1, a third portion 130 and a second support material SM2 are printed in the +Y-direction shown in the figure. The second support material SM2 is printed between x1 and x2, and the third portion 130 is printed between x2 and x3. Upon reaching the height y3, a fourth portion 140 is printed over the third portion 130 and the second support material SM2. Accordingly, a lower surface 142 of the fourth portion 140 is supported by the second support material SM2 while the fourth portion is printed to an upper surface 144 at a height y". Upon completion of printing the part 10, the first support material SM1 and the second support material SM2 are removed to provide the finished part 10 (FIG. 4). It should be understood that printing of the first support material SM1 and the second support material SM2 adds time, cost, and material waste to the production of the part 10.

Figure 2:
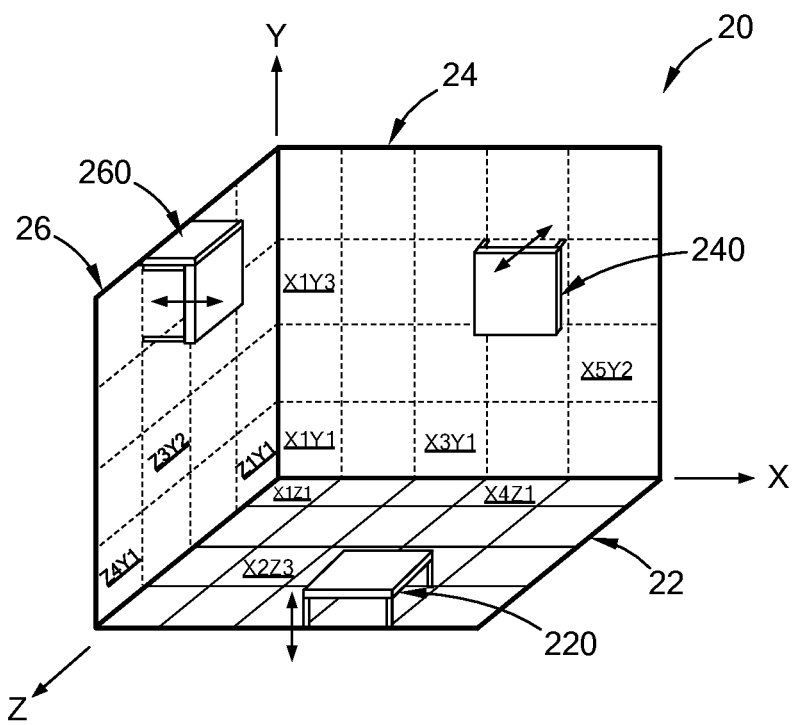
FIG. 2 is a schematic illustration of a dynamically adjustable support member and a dynamically adjustable build platform according to the teachings of the present disclosure.

Referring now to FIG. 2, a dynamically adjustable support member 220 (also referred to herein simply as "support member") is schematically depicted. As used herein, the phrase "dynamically adjustable" refers to movable during 3D printing of a part. The support member 220 is operable to move in the Y-direction shown in the figures. In some aspects of the present disclosure, the support member 220 may be part of a 3D printing chamber 20 that comprises a dynamically adjustable base 22 which includes a plurality of support members 220 that are operable to move in the Y-direction during printing of a part. FIG. 2 also schematically depicts a support member 240 that is operable to move in the Z-direction during printing of a part. In some aspects of the present disclosure, the support member 240 may be part of the 3D printing chamber 20 that comprises a dynamically adjustable wall 24 which includes a plurality of support members 240 that are operable to move in the Z-direction during printing of a part. A support member 260 is also schematically illustrated in FIG. 2. Similar to the support members 220 and 240, the support member 260 is operable to move in the X-direction during printing of a part. In some aspects of the present disclosure, the support member 260 may be part of the 3D printing chamber 20 that comprises a dynamically adjustable wall 26 which includes a plurality of support members 260 that are operable to move in the X-direction during printing of a part. While FIG. 2 schematically illustrates the support members 220, 240, and 260 movable in the Y-, Z-, and X-directions, respectively, it should be understood that support members movable in other directions, e.g., a combination of the X-, Y-, and Z-directions, and rotatable about a given direction, are included within the teachings of the present disclosure.

In some aspects of the present disclosure, the plurality of support members 220 may be indexed in the X-Z plane according to their position on a grid as depicted in the figure. That is, the support member 220 positioned at the intersection of the X- and Y-axes maybe indexed as the X1Z1 support member, a fourth support member 220 in a first row extending parallel to the X-axis may be indexed as the X4Z1 support member, and a second support member 220 in the third row extending parallel to the X-axis may be indexed as the X2Z3 support member. Similar identification and indexing of the support members 240 and the support members 260 may be included as schematically depicted in FIG. 2.

Still referring to FIG. 2, in some aspects of the present disclosure, each of the plurality of support members 220, 240 and/or 260 may be independently controlled. Accordingly, each of the support members 220 of the dynamically adjustable base 22 may be independently moved along the Y-direction depicted in the FIG. 2. Also, each of the support members 240 of the dynamically adjustable wall 240 may be independently moved along the Z-direction and each of the support members 260 of the dynamically adjustable wall 260 may be independently moved along the X-direction.

While FIG. 2 schematically illustrates two dynamically adjustable walls 24, 26, it should be understood that a 3D printing chamber and methods of using a 3D printing chamber with only 1 wall, three walls or four walls are included within the teachings of the present disclosure. Also, a 3D printing chamber with only a base comprising adjustable support members that have two or three degrees of freedom such that an unsupported member of a part can be supported by a dynamically adjustable support member during printing of the part is included within the teachings of the present disclosure.

Figure 3A:
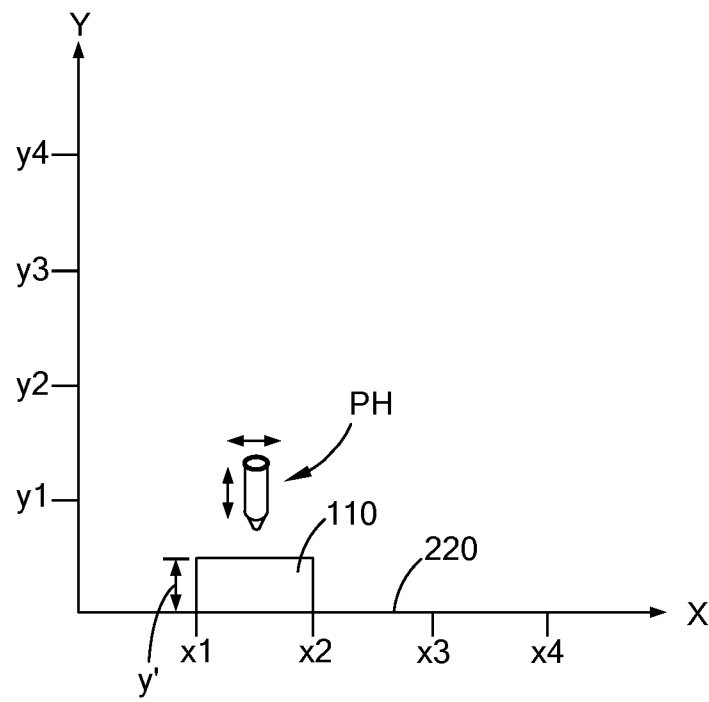
Figure 3B:
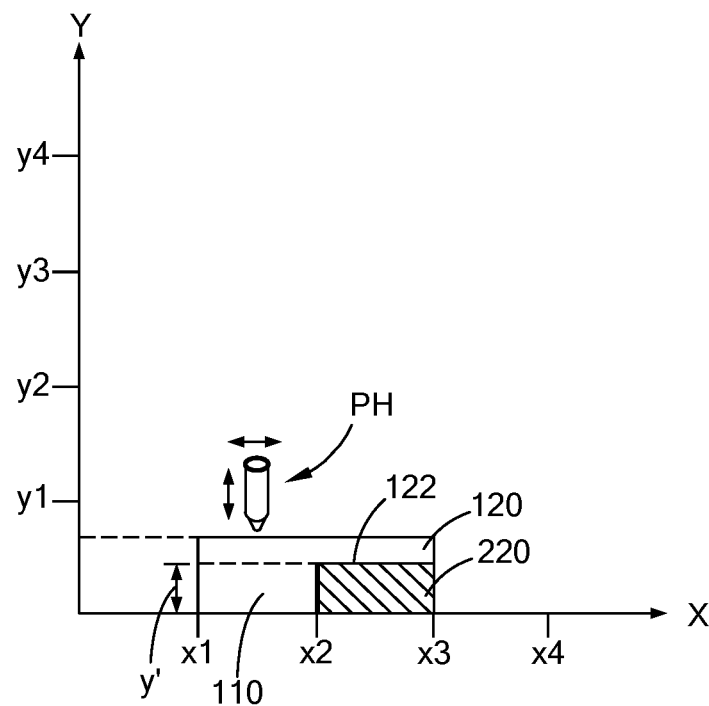

Referring now to FIGS. 3A-3E, a plurality of steps for 3D printing the part 10 using one or more dynamically adjustable support members according to the teachings of the present disclosure are schematically illustrated. Particularly, FIG. 3A schematically illustrates the printer head PH printing the first portion 110 between x1 and x2 along the X-axis and in the Y-direction. Upon reaching the height of about y' shown in FIG. 3A, the support member 220 moves from a retracted position schematically illustrated in FIG. 3A to a support position schematically illustrated in FIG. 3B. After the support member 220 moves to the support position, the printer head PH prints the second portion 120 of the part 10 between x1 and x3 along the X-axis and in the Y-direction. Accordingly, a lower surface 122 of the second portion 120 extending between x2 and x3 on the X-axis (also referred to herein as an "overhanging portion", e.g., a "first overhanging portion") is supported by the support member 220. While FIG. 3B schematically illustrates the lower surface 122 positioned directly on the support member 220, it should be appreciated that support material SM1 (not shown) may be printed and positioned between the support member 220 and the lower surface 122 of the second portion 120. That is, the support member 220 may move to a support position that is less than the height y' schematically illustrated in FIG. 3B and support material SM1 may be printed between the support member 220 and the lower surface 122 of the second portion 120. However, it should also be appreciated that the support member 220 in a support position that is less than the height y' reduces the amount of support material SM1 and the time required to print the support material SM1 for the production of the part 10.

Figure 3C:
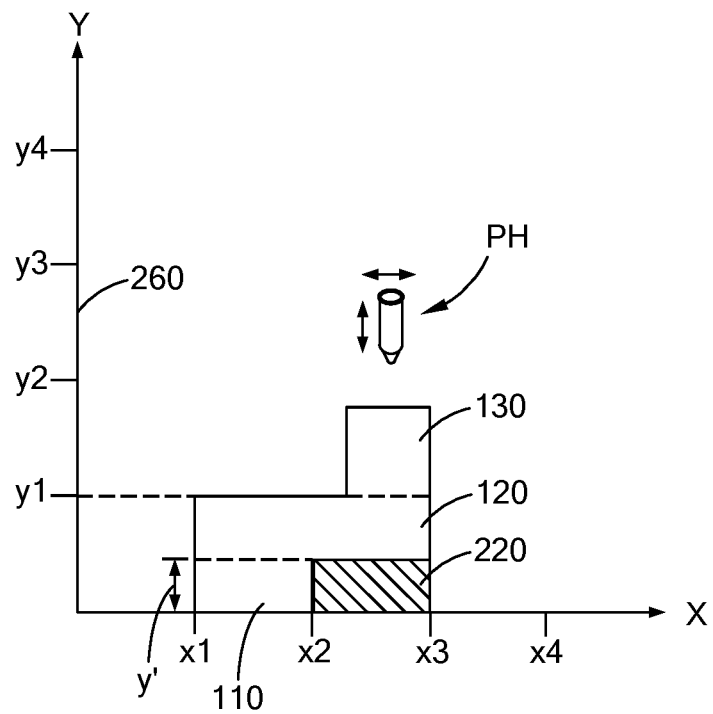
Figure 3D:
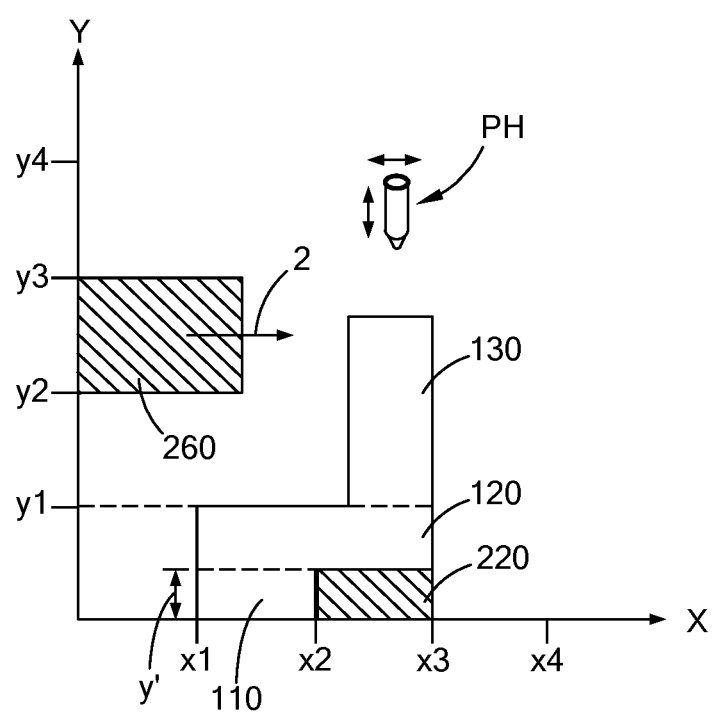
Figure 3E:
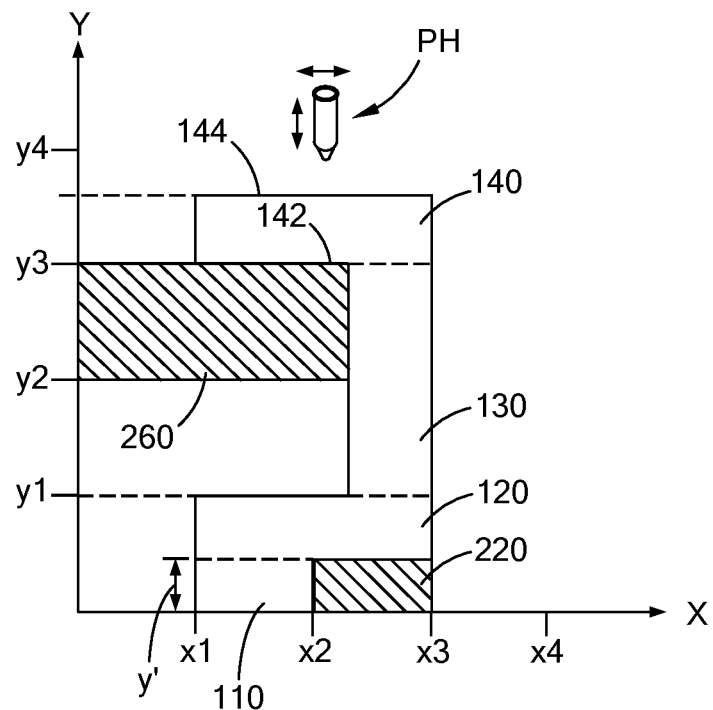

Referring now to FIG. 3C, the printer head PH continues printing the second portion 120 until reaching the height y1. After completing the second portion 120, the printer head PH prints the third portion 130 between x2 and x3 along the X axis and in the Y-direction. The third portion 130 is printed to a height of y3 (FIG. 3E). However, before or after the third portion 130 is completed, i.e., before or after the height of the third portion 130 reaches y3, the support member 260 moves in the X-direction from a retracted position schematically illustrated in FIG. 3C to a support position schematically illustrated in FIG. 3E and as indicated by the arrow 2 in FIG. 3D. After completing the third portion 130, the printer head PH prints the fourth portion 140 between x1 and x3 along the X axis and in the Y-direction. Accordingly, a lower surface 142 of the fourth portion 140 extending between x1 and x2 along the X-axis (also referred to herein as a "second overhanging portion") is supported by the support member 260. As shown in FIG. 3E, the second overhanging portion (not labeled) is spaced apart from the second portion 120 and the support member 260 is positioned therebetween. While FIG. 3E schematically illustrates the lower surface 142 positioned directly on the support member 260, it should be appreciated that support material SM2 (not shown) may be printed and positioned between the support member 260 and the lower surface 142 of the fourth portion 140. That is, the support member 260 in the support position may have a height less than y3 and support material SM2 may be printed between the support member 260 and the lower surface 142 of the fourth portion 140. However, it should also be appreciated that the support member 260 in a support position that is less than the height y3 reduces the amount of support material SM2 and the time required to print the support material SM2 for the production of the part 10.

Upon completion of the fourth portion 140, the part 10 may be removed from the 3D printing chamber 20 and any support material used during the printing of the part 10 removed in order to provide a finished part 10 as schematically illustrated in FIG. 4. In some aspects of the present disclosure, the support member 220 and the support member 260 are moved from the support position schematically illustrated in FIG. 3E to the retracted position schematically illustrated in FIG. 3A prior to removal of the part from the 3D printing chamber 20. In other aspects of the present disclosure, the support member 220 and the support member 260 are not moved from the support position schematically illustrated in FIG. 3E to the retracted position schematically illustrated in FIG. 3A prior to removal of the part from the 3D printing chamber 20. In still other aspects of the present disclosure, one of the support members 220 or 260 is moved from the support position schematically illustrated in FIG. 3E to the retracted position schematically illustrated in FIG. 3A and the other support member 260 or 220, respectively, is not moved from the support position schematically illustrated in FIG. 3E prior to removal of the part from the 3D printing chamber 20.

While FIGS. 3A-3E schematically illustrate two dynamically adjustable supports members, i.e., support members 220 and 260, used during the 3D printing of two overhanging ledges in the X-direction, it should be understood that the method taught in the present disclosure may be used to 3D print parts with more than two overhanging ledges and overhanging ledges extending in the X-, Y- and/or Z-directions. Also, the method disclosed in the present disclosure includes a combination of support members, either extending from a single base or a wall of a 3D printing chamber or extending from a combination of a base and a wall, or more than one wall, being used to support an overhanging ledge during 3D printing of a part.

Referring now to FIG. 5A, an isolated view of the support member 220 is shown. In some aspects of the present disclosure, the support member 220 includes a support surface 222 and a plurality of dynamically adjustable legs 224. The support surface 222 may extend between the plurality of dynamically adjustable legs 224 and one or more of the dynamically adjustable legs 224 is operable to extend and retract in the Y-direction. While FIG. 5A schematically illustrates all of the dynamically adjustable legs 224 extended an equal amount in the Y-direction, in some aspects of the present disclosure, all of the dynamically adjustable legs 224 are not extended an equal amount in the Y-direction such that an inclined support surface 222 is provided as schematically illustrated in FIG. 5B. Also, the support member 220, and other support members disclosed here in, may include a support surface that is not rectangular in shape as schematically illustrated in FIGS. 6C-6F. Non-limiting examples of support members without a rectangular shaped support surface include a support member 220 with a triangle-shaped support surface to 222a and three dynamically adjustable legs 224 schematically illustrated in FIG. 5C, a support member 220 with a hexagon-shaped support surface 222b and six dynamically adjustable legs 224 schematically illustrated in FIG. 5D, an arcuate-shaped support surface 222c schematically illustrated in FIG. 5E, and a prism-shaped support surface 222d schematically illustrated in FIG. 5F. In addition, the support member 220, and other support members disclosed herein, may include more than one support surface. For example, and as schematically illustrated in FIG. 2, the support member 260 may include a support surface extending parallel to the Y-Z plane (not labeled) and another support surface extending parallel to the X-Z plane (not labeled).

Referring now to FIG. 6, a method 30 for printing a part according to the teachings of the present disclosure is schematically illustrated. The method 30 includes receiving a 3D print design at step 300. The 3D print design may include locations (i.e., heights, lengths, widths, etc.) of a part where a support member is needed during the printing of the part. The extension of support member for positioning prior to the initiation of printing the part is included at step 310 and the 3D printing process is initiated at step 320. The 3D printing process is monitored at step 330, e.g., using switches, sensors, and the like, and a logical step of determining whether or not printing of the part has reached a position or location where extension of a support member is needed is included at step 340. In the event a position or location of the part has been reached (i.e., printed) such that extension of a support member is needed, the method 30 proceeds to step 350 where one or more support members moved to a support position. From step 350, the method 30 returns to step 330 to continue monitoring printing of the part. In the event that position or location of the part has not been reached such that extension of a support member is needed, the method 30 proceeds from step 340 to step 360 which monitors whether or not printing of the part has been completed. If printing of the part has not been completed, the method returns to step 340. In the alternative, of printing of the part has been completed, the method proceeds to step 370 where printing is terminated.

It should be understood from the present disclosure that a method for reducing the material, time and/or cost for printing a part is provided. The method includes extending one or more dynamically adjustable support members during printing of a part such that support material needed to support an overhanging portion of the part is not needed or is reduced. As used herein, the phrase "overhanging portion", refers to a portion of a 3D printed part that is supported during printing of the part. In some aspects of the present disclosure, the overhanging portion is supported such that the overhanging portion is allowed to cure and not sag due to the force of gravity before curing is complete. The reduction of the amount of support material needed for 3D printing the part reduces the time required to print the part, the amount of material used to print the part, and the cost to print the part. The one or more dynamically adjustable support members may be part of a 3D printing chamber with a base comprising one or more dynamically adjustable support members and/or one or more walls comprising one or more dynamically adjustable support members. The method includes moving at least one of the dynamically adjustable support members from a retracted position to a support position after a first portion of a part has been printed such that the support member does not restrict access to the first portion by a printer head. Accordingly, one or more overhanging portions of a part can be supported by a dynamically adjustable support member that is placed into a support position during printing of the parts, particularly after a first portion is printed underneath an overhanging portion.

The terms "upper", "lower", "over", and "underneath" as used herein refer to the position or location of a surface in the drawings and do not refer to an exact or specific orientation or location of a surface for a method or part formed by a method according the teachings of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of 3D printing a part comprising:
   3D printing a part in a 3D chamber with at least one portion requiring support during 3D printing of the part, wherein the 3D chamber comprises a base with a first dynamically adjustable support member extendable from the base, and a wall with a second dynamically adjustable support member extendable from the wall; and
   moving at least one of the first dynamically adjustable support member and the second dynamically adjustable support member to support the at least one portion of the part during 3D printing of the part.

2. The method of claim 1 further comprising moving the at least one of the first dynamically adjustable support member and the second dynamically adjustable support member from a retracted position to a support position after a first portion of the part is printed.

3. The method of claim 2, wherein the at least one portion requiring support is supported by the at least one of the first dynamically adjustable support member and the second dynamically adjustable support member in the support position.

4. The method of claim 1,
   the at least one portion of the part requiring support comprises a first overhanging portion and a second overhanging portion.

5. The method of claim 4 further comprising printing the first overhanging portion over the first dynamically adjustable support member and printing the second overhanging portion over the second dynamically adjustable support member.

6. The method of claim 4 further comprising moving the first dynamically adjustable support member from a retracted position to a support position after a first portion of the part is printed, wherein the first overhanging portion is supported by the first dynamically adjustable support member in the support position.

7. The method of claim 4 further comprising moving the second dynamically adjustable support member from a retracted position to a support position after a second portion of the part is printed, wherein the second overhanging portion is supported by the second dynamically adjustable support member in the support position.

8. The method of claim 4 further comprising:
   moving the first dynamically adjustable support member from a retracted position to a support position after a first portion of the part is printed, wherein the first overhanging portion is supported by the first dynamically adjustable support member in the support position; and moving the second dynamically adjustable support member from a retracted position to a support position after a second portion of the part is printed, wherein the second overhanging portion is supported by the second dynamically adjustable support member in the support position.

9. The method of claim 4 further comprising:

printing a first portion of the part;

moving the first dynamically adjustable support member from a retracted position to a support position after the first portion is printed;

printing the first overhanging portion of the part, wherein the first overhanging portion is supported by the first dynamically adjustable support member in the support position;

printing a second portion of the part;

moving the second dynamically adjustable support member from a retracted position to a support position; and printing the second overhanging portion of the part, wherein the second overhanging portion is supported by the second dynamically adjustable support member in the support position.

10. The method of claim 9, wherein the first overhanging portion extends from the first portion and the second overhanging portion extends from the second portion.

11. A method of printing a 3D part comprising:

printing a first portion of a part in a 3D printing chamber, wherein the 3D printing chamber comprises a base with a first dynamically adjustable support member and at least one wall angled relative to the base with a second dynamically adjustable support member;

moving the first dynamically adjustable support member from a retracted position to a support position after the first portion of the part has been printed; and printing a first overhanging portion of the part after the first dynamically adjustable support member has moved from the retracted position to the support position, wherein the first overhanging portion of the part is supported by the first dynamically adjustable support member in the support position.

12. The method of claim 11, wherein the first dynamically adjustable support member in the support position extends from the base and the second dynamically adjustable support member in a support position extends from the at least one wall.

13. The method of claim 12, wherein the first overhanging portion of the part is printed over the first dynamically adjustable support member before the second dynamically adjustable support member is moved from a retracted position to a support position.

14. The method of claim 13, further comprising printing a second overhanging portion of the part over the second dynamically adjustable support member after the second dynamically adjustable support member is moved to the support position.

15. The method of claim 14, wherein the first overhanging portion of the part extends from the first portion of the part and is supported by the first dynamically adjustable support member in the support position.

16. A method of 3D printing a part comprising:

printing a first portion of a part in a 3D printing chamber, wherein the 3D printing chamber comprises a base and at least one wall, wherein the base comprises a first dynamically adjustable support member operable to move from a retracted position to a support position and the at least one wall comprises a second dynamically adjustable support member operable to move from a retracted position to a support position;

moving at least one of the first dynamically adjustable support member and the second dynamically adjustable support member from the retracted position to the support position after the first portion of the part has been printed; and printing a second portion, wherein the second portion of the part is supported by at least one the first dynamically adjustable support member and the second dynamically adjustable support member in the support position while it is being printed.

17. The method of claim 16, wherein the second portion is spaced apart from the first portion and the at least one the first dynamically adjustable support member and the second dynamically adjustable support member in the support position is positioned between the first portion and the second portion of the part.

18. The method of claim 16, further comprising printing a support material on the at least one the first dynamically adjustable support member and the second dynamically adjustable support member before printing the second portion of the part.

19. The method of claim 18, wherein the second portion of the part is printed on the support material.

* * * * *